(12) United States Patent
Zhang et al.

(10) Patent No.: US 11,428,962 B2
(45) Date of Patent: Aug. 30, 2022

(54) OPTICAL MODULATOR AND METHOD OF FABRICATING AN OPTICAL MODULATOR USING RARE EARTH OXIDE

(71) Applicant: ROCKLEY PHOTONICS LIMITED, London (GB)

(72) Inventors: Yi Zhang, Pasadena, CA (US); Aaron John Zilkie, Pasadena, CA (US)

(73) Assignee: Rockley Photonics Limited, Oxford (GB)

(*) Notice: Subject to any disclaimer, the term of this patent is extended or adjusted under 35 U.S.C. 154(b) by 0 days.

(21) Appl. No.: 16/641,128

(22) PCT Filed: Aug. 21, 2018

(86) PCT No.: PCT/IB2018/001085
§ 371 (c)(1),
(2) Date: Feb. 21, 2020

(87) PCT Pub. No.: WO2019/038600
PCT Pub. Date: Feb. 28, 2019

(65) Prior Publication Data
US 2020/0292854 A1    Sep. 17, 2020

Related U.S. Application Data
(60) Provisional application No. 62/548,722, filed on Aug. 22, 2017.

(51) Int. Cl.
*G02F 1/025* (2006.01)
(52) U.S. Cl.
CPC .................... *G02F 1/025* (2013.01)

(58) Field of Classification Search
CPC ...................................................... G02F 1/025
See application file for complete search history.

(56) References Cited

U.S. PATENT DOCUMENTS

| 6,845,198 B2 | 1/2005 | Montgomery et al. |
| 6,858,864 B2 | 2/2005 | Atanackovic et al. |
| 7,199,015 B2 | 4/2007 | Atanackovic |
| 7,351,993 B2 | 4/2008 | Atanackovic |
| 7,384,481 B2 | 6/2008 | Atanackovic |
| 7,700,423 B2 | 4/2010 | Cooke et al. |
| 9,612,503 B2 | 4/2017 | Liang |
| 10,027,089 B2 * | 7/2018 | Liang .................... H01S 5/1032 |
| 10,274,757 B2 * | 4/2019 | Fujikata .................. G02F 1/025 |

(Continued)

FOREIGN PATENT DOCUMENTS

WO    WO 2016/157687 A1    10/2016

OTHER PUBLICATIONS

Examiner-generated reference number lists for cited references: Liang 20150380900, Zhang 20200292854, and Fujikata 20180074349 (Year: 2021).*

(Continued)

*Primary Examiner* — Andrew Jordan
(74) *Attorney, Agent, or Firm* — Lewis Roca Rothgerber Christie

(57) ABSTRACT

A MOS capacitor-type optical modulator and method of fabricating a MOS capacitor-type optical modulator, wherein the MOS capacitor-type optical modulator has a MOS capacitor region which comprises an insulator formed of an epitaxially grown crystalline rare earth oxide (REO).

23 Claims, 8 Drawing Sheets

(56) References Cited

U.S. PATENT DOCUMENTS

| | | | |
|---|---|---|---|
| 10,605,987 B2* | 3/2020 | Clark | H01L 21/8258 |
| 10,838,240 B2* | 11/2020 | Yu | G02F 1/017 |
| 2006/0035450 A1 | 2/2006 | Frank et al. | |
| 2010/0148322 A1 | 6/2010 | Allibert et al. | |
| 2010/0266233 A1 | 10/2010 | Morris et al. | |
| 2011/0073989 A1 | 3/2011 | Rong et al. | |
| 2011/0097030 A1 | 4/2011 | Urino | |
| 2011/0298089 A1* | 12/2011 | Krishnan | H01L 29/66181 |
| | | | 257/532 |
| 2015/0055910 A1* | 2/2015 | Liang | G02B 6/125 |
| | | | 385/2 |
| 2015/0301363 A1* | 10/2015 | Chen | H01L 29/4966 |
| | | | 385/3 |
| 2015/0380900 A1* | 12/2015 | Liang | H01S 5/1032 |
| | | | 385/2 |
| 2018/0074349 A1* | 3/2018 | Fujikata | G02F 1/025 |
| 2019/0187494 A1* | 6/2019 | Hiraki | G02F 1/025 |
| 2019/0227233 A1* | 7/2019 | Clark | H01L 21/02521 |
| 2019/0258094 A1* | 8/2019 | Oh | G02F 1/025 |
| 2019/0293971 A1* | 9/2019 | Yu | G02F 1/017 |
| 2019/0384135 A1* | 12/2019 | Takahashi | G02F 1/2257 |
| 2020/0292854 A1* | 9/2020 | Zhang | G02F 1/025 |

OTHER PUBLICATIONS

European Patent Office Communication Pursuant to Article 94(3) EPC, for Patent Application No. EP 18 783 084.9, dated Dec. 22, 2020, 7 pages.

Dargis, R. et al., "Epitaxial Si and $Gd_2O_3$ Heterostuctures: Distributed Bragg Reflectors with Stress Management Function for GaN on Si Light Emitting Devices", ECS Journal of Solid State Science and Technology, 2012, pp. P246-P249, The Electrochemical Society.

Gottlob, H.D.B. et al., "CMOS integration of epitaxial $Gd_2O_3$ high-k gate dielectrics", Solid-State Electronics, 2006, pp. 979-985, vol. 50, Elsevier Ltd.

Han, J-H. et al., "Efficient low-loss InGaAsP/Si hybrid MOS optical modulator", Letters, Nature Photonics, Jul. 24, 2017, pp. 1-6, Macmillan Publishers Limited.

Hiraki, T. et al., "Heterogeneously integrated III-V/Si MOS capacitor Mach-Zehnder modulator", Letters, Nature Photonics, Jul. 17, 2017, pp. 1-5, Macmillan Publishers Limited.

International Search Report and Written Opinion of the International Searching Authority, dated Nov. 14, 2018, corresponding to PCT/IB2018/001085, 15 pages.

Liang, D. et al., "Integrated finely tunable microring laser on silicon", Letters, Nature Photonics, Sep. 12, 2016, pp. 1-4, Macmillan Publishers Limited.

Osten, H. J. et al., "Introducing crystalline rare-earth oxides into Si technologies", Physica Status Solidi A, 2008, pp. 695-707, No. 4, WILEY-VCH Verlag GmbH & Co. KGaA, Weinheim.

Website: cREO, printed May 28, 2020, 1 page, http://www.iqep.com/markets/cmos/creo/, IQE PLC.

Webster, M. et al, "An Efficient MOS-Capacitor based Silicon Modulator and CMOS Drivers for Optical Transmitters", 2014, pp. 1-2, IEEE.

* cited by examiner

A. starting SOI

B. p doping and trench patterning

C. 1st REO epi

D. HF dip (and CMP if needed)

E. REO and III-V epi

F. waveguide and doping

A. starting SOI

B. p doping and trench patterning

C. 1st REO epi

D. CMP

E. III-V epi

F. waveguide and doping

OPTICAL MODULATOR AND METHOD OF FABRICATING AN OPTICAL MODULATOR USING RARE EARTH OXIDE

CROSS-REFERENCE TO RELATED APPLICATION(S)

This application is a national stage entry, under 35 U.S.C. § 371, of International Application Number PCT/IB2018/001085, filed on Aug. 21, 2018, which claims priority to and the benefit of U.S. Provisional Patent Application No. 62/548,722, filed Aug. 22, 2017. The entire contents of all of the applications identified in this paragraph are incorporated herein by reference.

FIELD

One or more aspects of embodiments according to the present invention relate to optical modulators, and more particularly to metal-oxide-semiconductor (MOS) capacitor type optical modulators.

BACKGROUND

Conventional optical phase modulators can be inefficient, bulky and may have a high loss. In terms of size, they are often mm or cm long, and require high drive voltage leading to a high "V$\pi$L", which is the product of voltage required to achieve pi phase change and the device length. A typical depletion-type silicon modulator has a V$\pi$L greater than 2 V*cm, and insertion loss greater than 4 dB.

Silicon MOS capacitor-type modulators are efficient but may still exhibit high losses. For example, a V$\pi$L=0.2 V*cm, IL=2.6 dB is reported in Webster's paper in GFP 2014 and U.S. Pat. No. 6,845,198. This device uses a poly crystalline silicon, which has the added disadvantage of high optical losses.

III-V Si MOS capacitor-type modulators are more efficient and exhibit lower losses, but are considered less suitable for high volume manufacture.

A V$\pi$L=0.047 V*cm, IL=0.23 dB is reported in Han's paper in Nature Photonics 2017 (DOI:10.1038/NPHOTON.2017.122). U.S. Pat. No. 9,612,503, Liang's paper in Nature Photonics 2016 (DOI:10.1038/NPHOTON.2016.163), and Hiraki's paper in Nature Photonics 2017 (DOI: 10.1038/NPHOTON.2017.120) relate to devices fabricated by bonding pieces of III-V material on silicon wafer, which is also not favorable for volume manufacturing.

U.S. Pat. No. 7,700,423 B2 discloses an example of a process for manufacturing epitaxial wafers for integrated devices on a common compound semiconductor III-V wafer.

It is known that crystalline rare earth oxide layers can be grown on Silicon. For example, Gottlob et al., Solid-State Electronics 50 (2006) 979-985 discloses Gd2O3 grown on a (001) oriented Si by a modified epitaxy process. An example of a crystalline REO multilayer structure grown on Si(111) is shown in ECS Journal of Solid State Science and Technology, 1 (5) P246-P249 (2012). Osten et al., phys. stat. sol. (a) 205, No. 4, 695-707 (2008) describes the use of crystalline REOs in silicon structures.

SUMMARY

The present invention aims to solve the above problems by providing, according to a first aspect, a capacitor-type optical MOS modulator, with a MOS capacitor region which comprises an insulator formed of an epitaxially grown crystalline rare earth oxide (REO). The MOS capacitor region is made up of a p-doped region, a rare earth oxide insulator, and an n-doped region.

In this way, the modulator captures the favorable properties of MOS capacitor modulators, i.e. high efficiency and low loss whilst also benefiting from the advantages of a wafer scale process that is suitable for volume manufacturing.

In particular, in the fabrication of the present device, an n-doped region (e.g. an epitaxial layer of III-V material) can be grown on top of the insulator layer of the MOS capacitor junction. Thereby marking an improvement over prior art designs in which a top layer of a junction is formed by placing of a die rather than epitaxial growth.

Furthermore, crystalline REO has a high dielectric constant and is a better gate material than silicon dioxide.

Examples of suitable insulator materials are rare earth oxides. For example oxides of lanthanides and actinides, and in particular, erbium and gadolinium.

Optional features of the invention will now be set out. These are applicable singly or in any combination with any aspect of the invention.

Optionally, the optical modulator is a III-V Si MOS modulator and is therefore fabricated on an SOI substrate.

Optionally, the capacitor-type is a III-V Si MOS modulator, where the silicon of the SOI substrate has a (111) crystalline structure.

In this way, the whole device is a single crystalline structure, while all other technologies have at least an amorphous or polycrystalline part. This feature of a single crystalline structure can be identified by cross-section imaging, such as TEM. The device can also be identified by looking at special cross-section features, such as a trench with a thin layer of silicon at the bottom and filled with crystalline REO.

Optionally, the crystalline REO comprises erbium oxide or gadolinium oxide, although it is envisaged that other oxides of lanthanides and actinides may provide suitable alternatives.

Optionally, the modulator comprises a p-doped layer below the crystalline REO and an n-doped epitaxially grown layer above the crystalline REO to form the MOS capacitor region at which an optical mode propagates.

Optionally, the p-doped layer is p-doped Si (111).

Typically, the n-doped layer is an n-doped region of a type III-V material. Optionally, the n-doped layer is n doped InP or InGaAsP. One advantage provided by a top layer of InGaAsP is the fact that the top layer then provides the ability to tune the bandgap.

Optionally, the insulator comprises:

a first region of crystalline REO within a silicon layer of an SOI substrate; and an additional layer of crystalline REO; the additional layer deposited on top of the silicon layer and also on top of the first region of crystalline REO.

The first region of REO serves as a cladding such that the optical mode of the waveguide modulator propagates in a region of the modulator that is within and above the p-doped portion, i.e. not above the first region of crystalline REO.

Optionally, the additional layer of crystalline REO has a thickness of no more than 10 nm Optionally, the additional layer of crystalline REO has a thickness of no more than 50 nm.

Optionally, the first region of crystalline REO has a thickness of no more than 90 nm.

Optionally, the first region of crystalline REO has a thickness of no more than 300 nm.

According to a second aspect of the present invention, there is provided, a method of fabricating a MOS capacitor-type III-V Si MOS optical modulator, the method comprising the steps of:

providing a silicon-on-insulator (SOI) substrate;

creating a p-doped region in the top silicon layer of the SOI layer of the substrate;

etching a trench adjacent the p doped region in the silicon top layer of the SOI substrate;

growing a first region of crystalline rare earth oxide (REO) layer in the trench;

creating a p-doped region adjacent the first crystalline rare earth oxide (REO) layer;

growing an additional crystalline rare earth oxide (REO) layer above the first region of crystalline rare earth oxide (REO) layer and the p-doped region; and growing an n-doped region above the additional crystalline rare earth oxide (REO) layer.

According to a third aspect of the present invention, there is provided, a method of fabricating a capacitor-type III-V Si MOS optical modulator, the method comprising the steps of:

providing a silicon-on-insulator (SOI) substrate;

creating a p-doped region within the top silicon layer of the SOI substrate;

etching a trench in the top silicon layer of the SOI substrate adjacent the p-doped region;

growing a first region of crystalline rare earth oxide (REO) in the trench;

growing a crystalline rare earth oxide (REO) layer above the first region of crystalline rare earth oxide (REO) and the p-doped region; and growing a n-doped region above the additional crystalline rare earth oxide (REO) layer.

The step of p-doping the silicon is described above as being carried out before the step of growing crystalline REO. However, it should be envisaged that this step could alternatively be carried out after the growth of REO. Furthermore, it should be noted that the p-doped region could be continuous with the first REO region or, in alternative embodiments, could be separate from the first REO region.

According to further embodiments of the first aspect of the present invention, optionally, the insulator comprises: a first region of a first material within a silicon layer of an SOI substrate; and a layer of crystalline REO; the additional layer deposited on top of the silicon layer and also on top of the first region of a first material.

Optionally, the first material consists of a material having a lower refractive index value than silicon. In some embodiments, the first material may be InP or a material with similar optical properties.

Optionally, the first material consists of an oxide.

Optionally, the first material is crystalline.

According to a further aspect of the present invention, there is provided, a method of fabricating a MOS capacitor-type optical modulator, the method comprising the steps of:

providing a substrate;

creating a p-doped region in the top layer of the substrate;

etching a trench adjacent the p doped region in the top layer of the substrate;

growing a first region of a first material in the trench;

growing a crystalline rare earth oxide (REO) layer above the first region of a first material and the p-doped region; and growing an n-doped region above the crystalline rare earth oxide (REO) layer.

BRIEF DESCRIPTION OF THE DRAWINGS

These and other features and advantages of the present invention will be appreciated and understood with reference to the specification, claims, and appended drawings wherein:

DETAILED DESCRIPTION

The detailed description set forth below in connection with the appended drawings is intended as a description of exemplary embodiments of a capacitor-type optical modulator, specifically a capacitor-type III-V Si MOS modulator provided in accordance with the present invention and is not intended to represent the only forms in which the present invention may be constructed or utilized. The description sets forth the features of the present invention in connection with the illustrated embodiments. It is to be understood, however, that the same or equivalent functions and structures may be accomplished by different embodiments that are also intended to be encompassed within the spirit and scope of the invention. As denoted elsewhere herein, like element numbers are intended to indicate like elements or features.

A capacitor-type III-V Si MOS modulator, is described below with reference to FIGS. 1-4.

The modulator is a capacitor-type modulator, 1 comprising an insulator formed of an epitaxially grown crystalline rare earth oxide (REO), 11 on an SOI substrate. The epitaxially grown crystalline REO 11 may include a first region of crystalline REO 11a within a top silicon layer of the SOI substrate and an additional layer of crystalline REO 11b on top of the SOI substrate and also on top of the first region of crystalline REO 11a.

Figure 1:
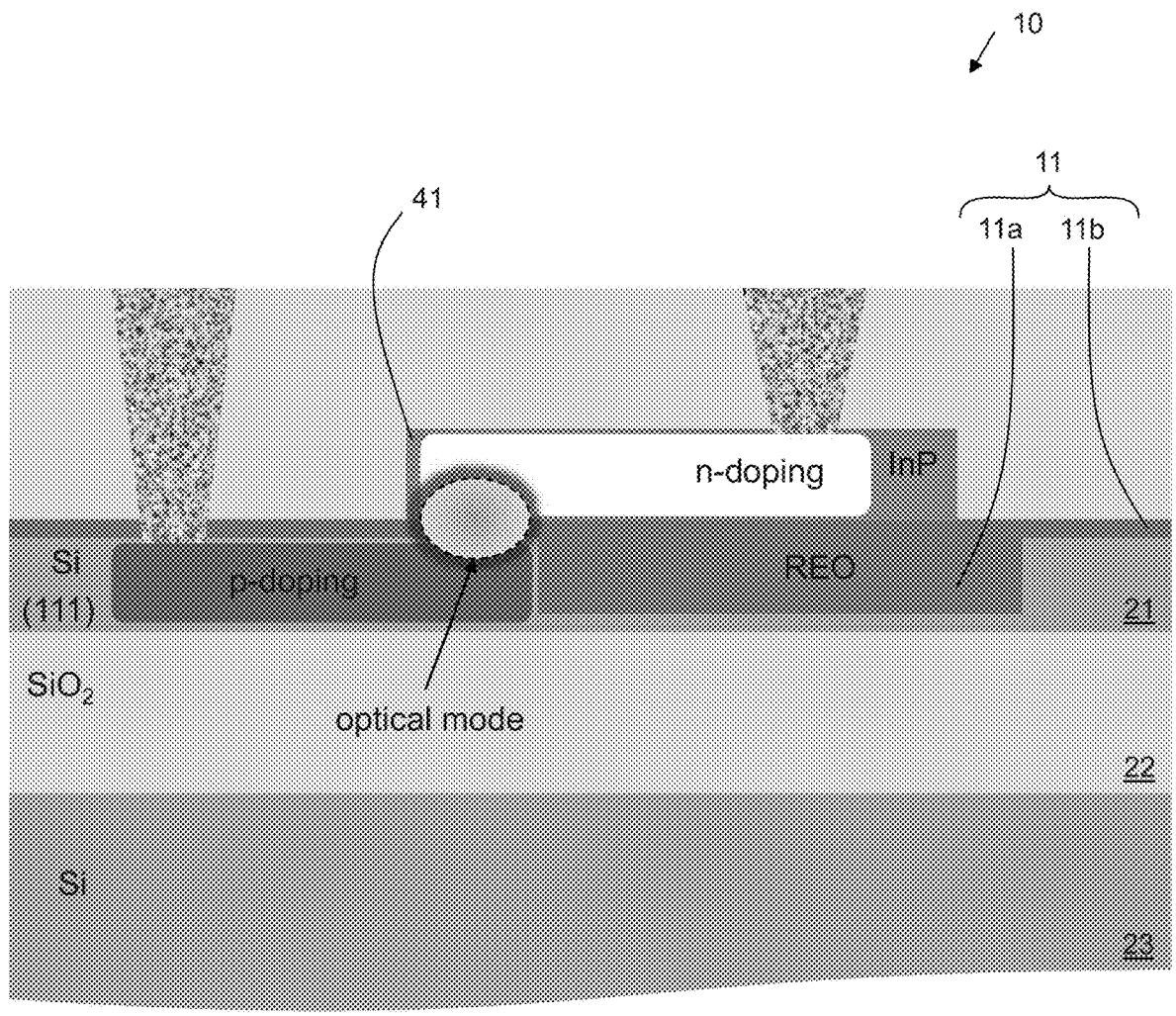
FIG. 1 is a schematic cross-section of a capacitor-type III-V Si MOS modulator according to an embodiment of the present invention.
Figure 2A:
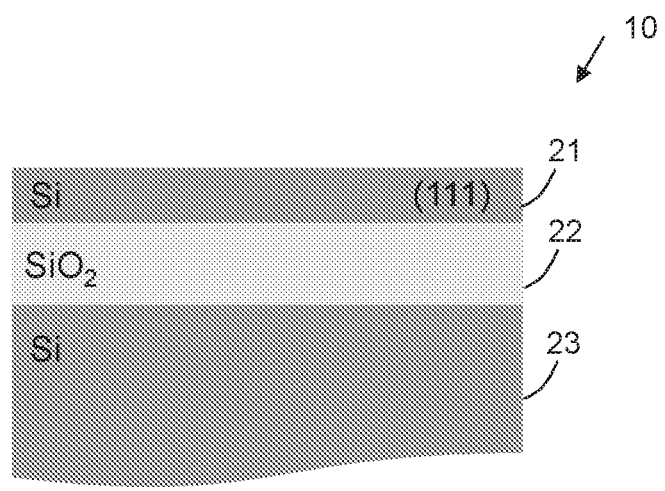
FIGS. 2A-F depict steps of a method of fabricating the modulator of FIG. 1.

In the embodiments shown in FIGS. 2A-F, a silicon-on-insulator (SOI) substrate is initially provided comprising a silicon base layer 23, a silicon oxide insulator layer 22, and a silicon top layer 21, the silicon top layer typically having a Si (111) crystalline structure (FIG. 2A).

Figure 2B:
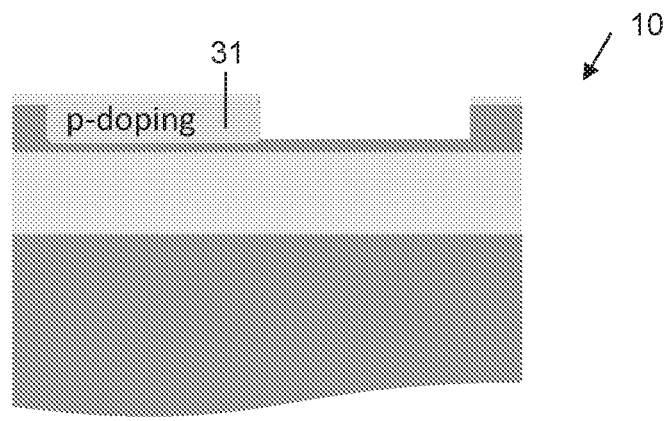
Figure 2C:
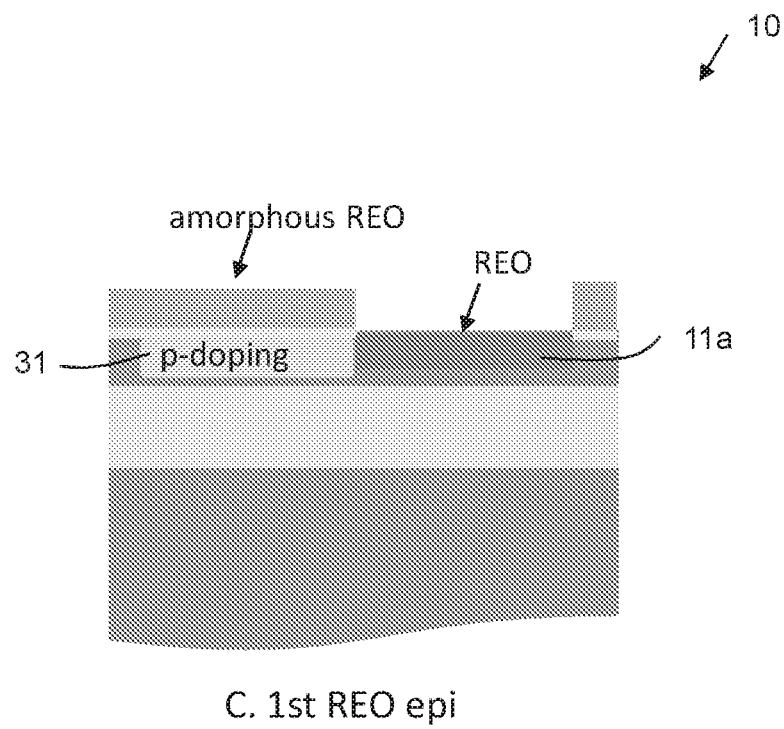

A p-doped region 31 is created within the Si top layer 21 and a trench is etched in the silicon layer of the SOI substrate (FIG. 2B). The p-doped region is created using standard implantation techniques and the trench etched using standard patterning and etching techniques.

A first crystalline rare earth oxide (REO) layer IIa is grown in the trench (FIG. 2C), in order to form an optical waveguide cladding for the final device. During the growth of this REO layer, an amorphous REO layer will be formed on top of any patterning layer present.

The p-doped region lies adjacent the first crystalline rare earth oxide (REO) layer, both being located within the top Si layer of the SOI substrate.

Figure 2D:
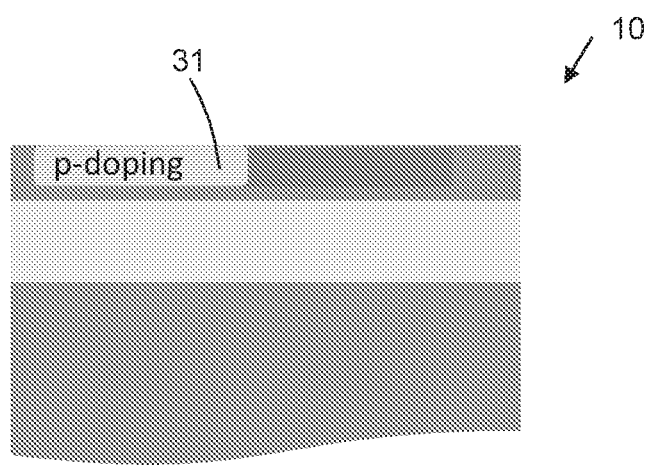

According to this fabrication method, and as shown in FIG. 2D, any patterning layer and amorphous REO is then removed, including an optional CMP step (Chemical Mechanical Planarization).

Figure 2E:
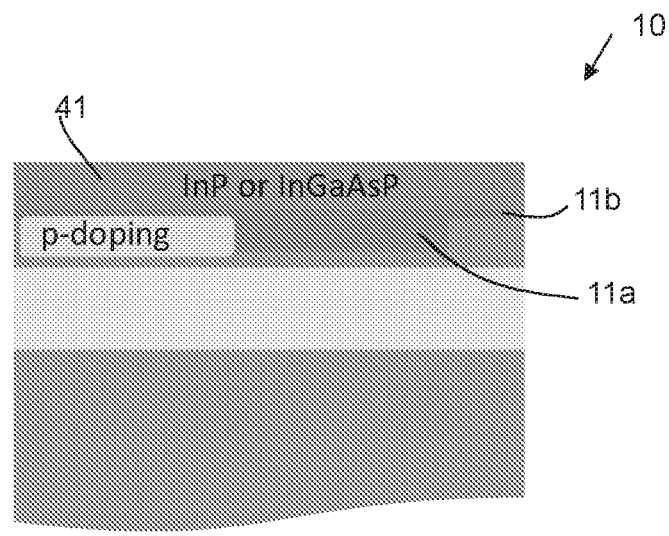
Figure 2F:
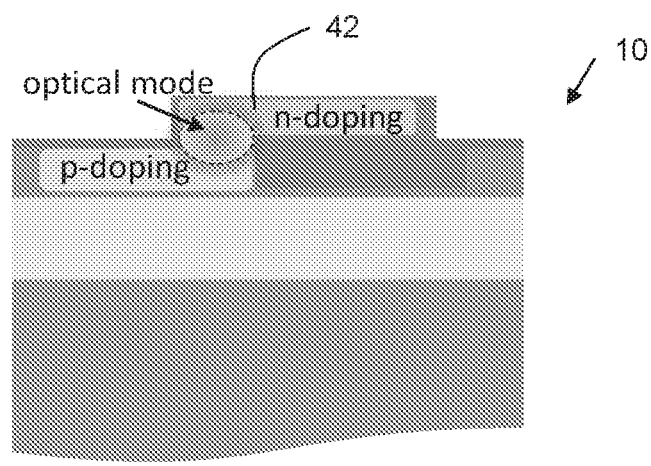

An additional crystalline rare earth oxide (REO) layer 11b (i.e. a "top layer" of REO) is then grown directly onto the first crystalline rare earth oxide (REO) region 11a, and therefore laying above the first crystalline REO layer and also extending above the p-doped region (FIG. 2E).

An n-doped region 42 of a type III-V semiconductor material 41, (in this example embodiment, InP or InGaAsP) is created above the additional crystalline rare earth oxide (REO) layer. This involves the growth of the III-V layer and in situ doping. Again, standard epitaxial growing techniques and dopant techniques are used. The n-doped region is offset from the p-doped region so that a MOS capacitor region is created; the capacitor region extending only a part of the way along the p-doped layer. The n-doped layer extends laterally from the MOS capacitor region in the opposite direction from the p-doped region. Electrical contacts are applied to regions of the p-doped and the n-doped layers that are laterally offset from the MOS capacitor region. The doping concentrations for n and p-doped regions are typically between $1 \times 10^{17}$ and $5 \times 10^{18}$ cm$^{-3}$.

The REO has a lower refractive index than the silicon and the III-V layer. The REO deposited in the step shown in FIG. 2C therefore serves as part of the optical waveguide cladding in the device structure shown in FIG. 2F. The By polishing the SOI layer (FIG. 2D), in the region at which it is replaced by crystalline REO, a single crystalline and planar surface can be created, which creates a good starting substrate for the second region crystalline REO and n-doped region to be grown, as shown in FIG. 2E.

A further example of a fabrication method is described below with reference to FIGS. 3A-F where like reference numbers are used to indicate those features already described above in relation to FIGS. 2A-F.

Figure 3A:
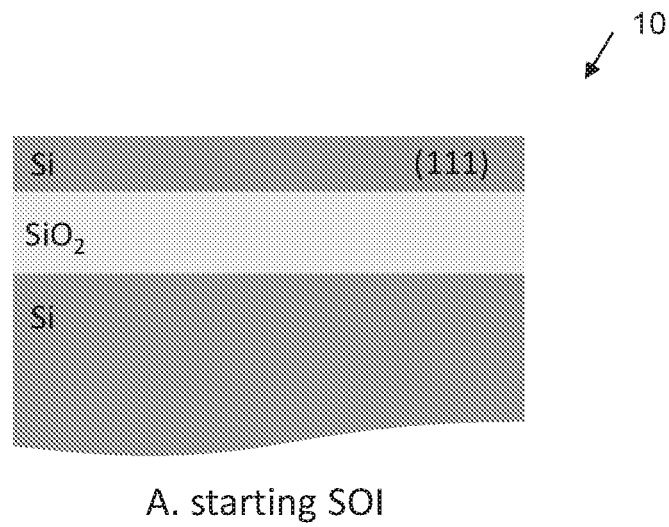
FIGS. 3A-F depict steps of an alternative method of fabricating the modulator of FIG. 1.
Figure 3B:
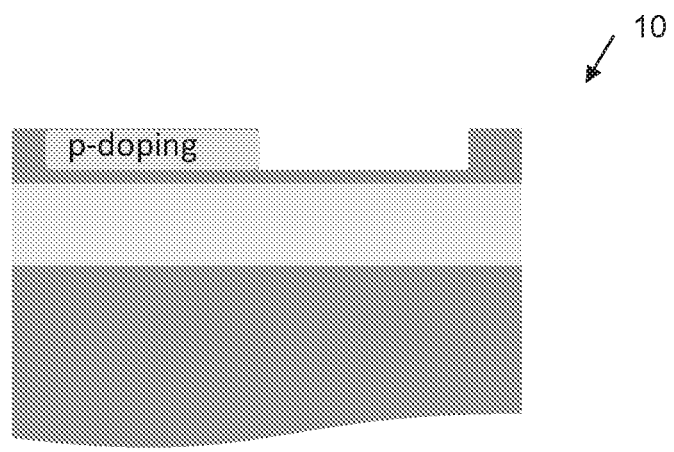
Figure 3C:
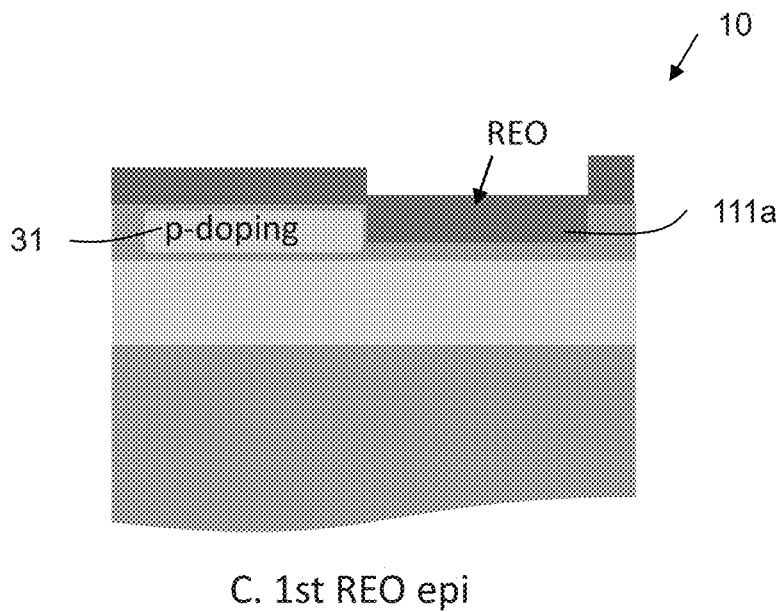
Figure 3D:
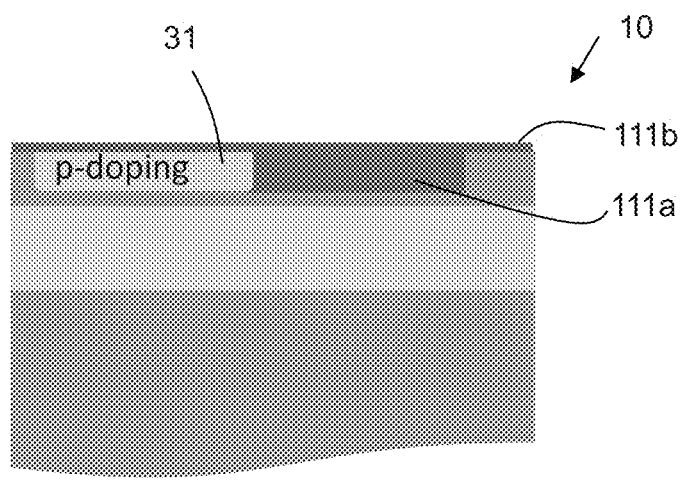
Figure 3E:
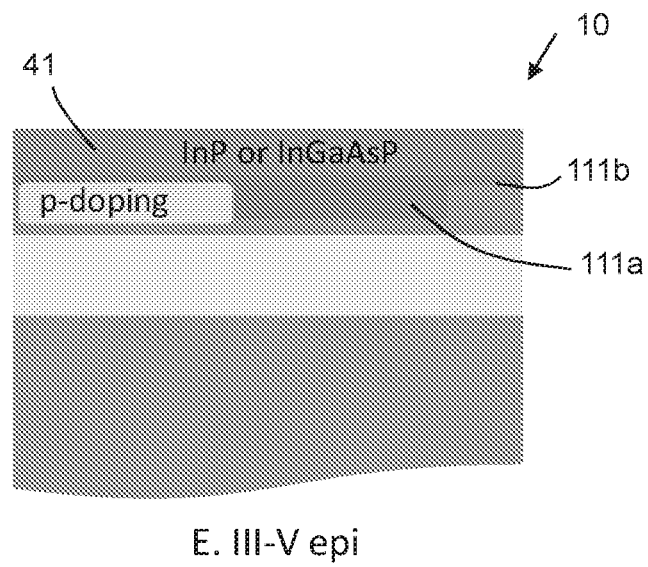
Figure 3F:
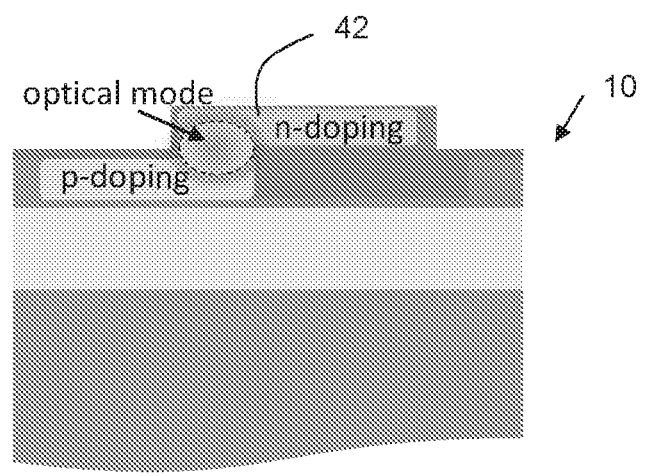

The fabrication method of FIGS. 3A-F differs from that of FIGS. 2A-F in that the step of growing the first crystalline rare earth oxide (REO) region 111a and the step of growing the crystalline rare earth oxide (REO) layer 111b above the first REO region 111a are carried out in a single epitaxial growth step, rather than in two separate steps. This involves removing any patterning layer before epitaxial growth of the REO (FIG. 3C). The epitaxial growth of REO is then carried out so that the depth of the REO above the base of the trench is greater than the depth of the trench. Subsequent polishing of the REO can be used to create a singly grown REO layer which includes both the first region 111a inside the trench, for cladding purposes, and also the additional REO layer 111b above the first REO region and the p-doped region; the additional layer of REO 111b acting as the insulator of the capacitor-type modulator.

Figure 4:
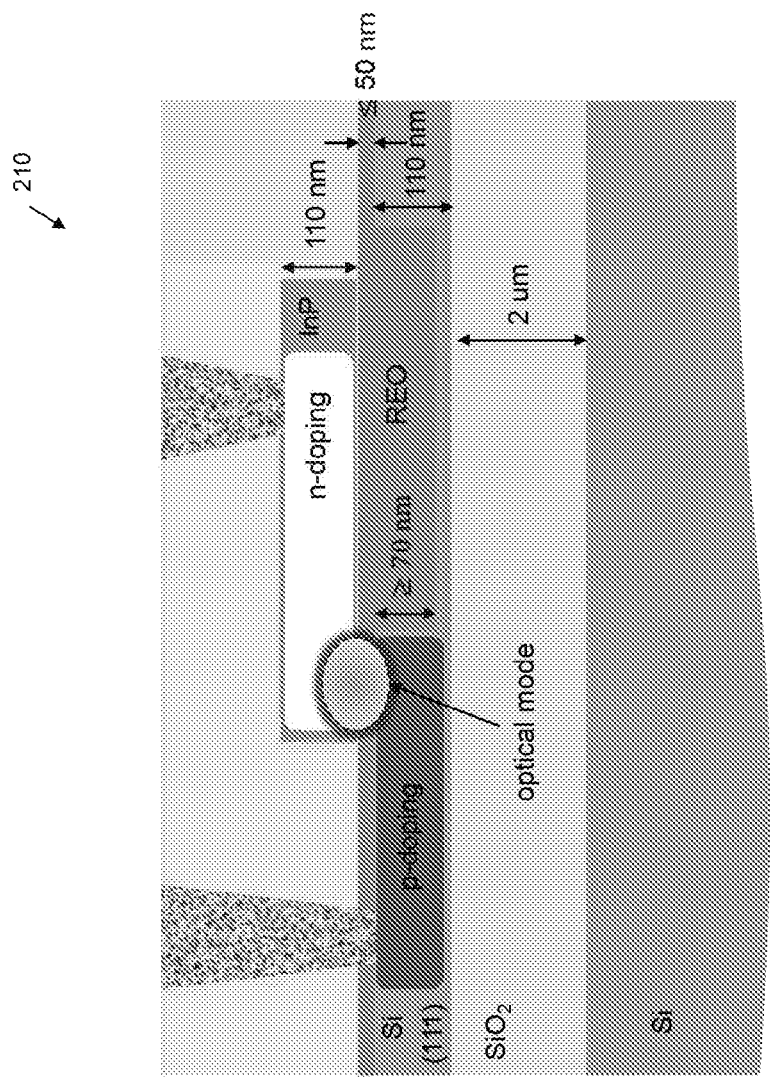
FIG. 4 depicts a schematic cross-section of a capacitor-type III-V Si MOS modulator according to a further embodiment of the present invention, with example layer thicknesses.

Example dimensions are shown in FIG. 4; although it should be understood that the modulator of the present invention extends to the same structure having different dimensions.

The examples set out with reference to the drawings include a region of a first material 11a which consists of a rare earth oxide REO and then an additional layer 11b of crystalline REO, grown on top of the first material 11a. It is envisaged that this region of a first material 11a could consist of materials other than REO. For example, any material having a refractive index lower than that of silicon or any oxide material. It is appreciated that a first material that is crystalline may be desirable in some embodiments. A non-crystalline first material 11a could result in degradation at the interface between the first material 11a and the REO layer 11b or degradation of the REO layer 11b itself in the region above the first material 11a (for example making it non-crystalline). However, since any degradation would be laterally displaced from the optical mode, the effect it has on the propagating mode may be minimal.

Although exemplary embodiments of a capacitor-type MOS optical modulator have been specifically described and illustrated herein, many modifications and variations will be apparent to those skilled in the art. Accordingly, it is to be understood that a capacitor-type MOS optical modulator constructed according to principles of this invention may be embodied other than as specifically described herein. In particular, whilst the detailed description above relates to examples of a capacitor-type III-V Si MOS optical modulator, it is appreciated that other embodiments could be created using the same fabrication methods but on different materials. For example, for longer wavelength regimes (e.g. >1.55 μm), the substrate material may take the form of germanium. The invention is also defined in the following claims, and equivalents thereof.

What is claimed is:

1. A MOS capacitor-type optical modulator, with a MOS capacitor region which comprises an insulator formed of crystalline rare earth oxide (REO), the MOS capacitor-type optical modulator comprising a p-doped layer below the crystalline REO and an n-doped crystalline layer above the crystalline REO to form the MOS capacitor region in which an optical mode is to propagate,
   wherein a first part of the crystalline REO extends beyond the p-doped layer in a first direction parallel to an interface between the n-doped crystalline layer and the crystalline REO, and
   wherein a part of the n-doped crystalline layer overlaps the first part of the crystalline REO.

2. The MOS capacitor-type optical modulator of claim 1, where the crystalline REO is epitaxially grown on a silicon-on-insulator (SOI) substrate.

3. The MOS capacitor-type optical modulator of claim 2, wherein a top silicon layer of the SOI substrate has a (111) crystalline orientation.

4. The MOS capacitor-type optical modulator, of claim 1, wherein the crystalline REO comprises erbium oxide or gadolinium oxide.

5. The MOS capacitor-type optical modulator of claim 1, wherein the p-doped layer is p-doped Si.

6. The MOS capacitor-type optical modulator of claim 1, wherein the n-doped crystalline layer is a type III-V material.

7. The MOS capacitor-type optical modulator of claim 6, wherein the n-doped crystalline layer is a n-doped InP or InGaAsP.

8. The MOS capacitor-type optical modulator of claim 1, wherein the insulator comprises:
   a first region of crystalline REO within a silicon layer of an SOI substrate; and
   an additional layer of crystalline REO, the additional layer of crystalline REO located on top of the silicon layer and also on top of the first region of crystalline REO.

9. The MOS capacitor-type optical modulator of claim 8, wherein the additional layer of crystalline REO has a thickness of no more than 50 nm.

10. The MOS capacitor-type optical modulator of claim 8, wherein the first region of crystalline REO has a thickness of no more than 300 nm.

11. The MOS capacitor-type optical modulator of claim 1, wherein the insulator comprises:
   a first region of a first material within a silicon layer of an SOI substrate; and an additional layer of crystalline REO, the additional layer of crystalline REO deposited on top of the silicon layer and also on top of the first region of the first material.

12. The MOS capacitor-type optical modulator according to claim 11, wherein the first material consists of a material having a lower refractive index value than silicon.

13. The MOS capacitor-type optical modulator according to claim 11, wherein the first material consists of an oxide.

14. The MOS capacitor-type optical modulator according to claim 11, wherein the first material is crystalline.

15. A method of fabricating the MOS capacitor-type optical modulator of claim 1, the method comprising the steps of:
    providing a silicon-on-insulator (SOI) substrate;
    creating the p-doped layer in a top silicon layer of the SOI substrate;
    etching a trench adjacent the p-doped layer in the top silicon layer of the SOI substrate;
    growing a first region of crystalline REO in the trench;
    growing a crystalline REO layer above the first region of crystalline REO and the p-doped layer; and
    growing the n-doped crystalline layer above the crystalline REO layer.

16. The method of claim 15, wherein the n-doped crystalline layer is a type III-V semiconductor material.

17. The method of claim 15, wherein the step of growing the first region of crystalline REO and the step of growing the crystalline REO layer above the first region of crystalline REO are carried out in a single epitaxial growth step.

18. A method of fabricating the MOS capacitor-type optical modulator of claim 1, the method comprising the steps of:
    providing a substrate;
    creating the p-doped layer in a top layer of the substrate;
    etching a trench adjacent the p-doped layer in the top layer of the substrate;
    growing a first region of a first material in the trench;
    growing a crystalline REO layer above the first region of the first material and the p-doped layer; and
    growing the n-doped crystalline layer above the crystalline REO layer.

19. The method of claim 18, wherein the first material is crystalline REO.

20. The MOS capacitor-type optical modulator of claim 1, wherein the part of the n-doped crystalline layer that overlaps the first part of the crystalline REO extends in the first direction from a region where the n-doped crystalline layer overlaps the p-doped layer, and
    wherein a part of the p-doped layer extends in a second direction parallel to the interface between the n-doped crystalline layer and the crystalline REO and from the region where the n-doped crystalline layer overlaps the p-doped layer.

21. The MOS capacitor-type optical modulator of claim 1, wherein a thickness of the first part of the crystalline REO is greater than a thickness of a part of the crystalline REO that overlaps the p-doped layer.

22. The MOS capacitor-type optical modulator of claim 21, wherein the p-doped layer is in a silicon layer, and
    wherein a lower portion of the first part of the crystalline REO is in the silicon layer and adjacent to the p-doped layer.

23. The MOS capacitor-type optical modulator of claim 1, wherein a second part of the crystalline REO extends beyond the p-doped layer in a second direction parallel to the interface between the n-doped crystalline layer and the crystalline REO.

* * * * *